Nov. 2, 1948.　　　　　R. I. OLSEN　　　　　2,452,597
LOW TEMPERATURE ENGINE STARTING AID
Filed May 28, 1947
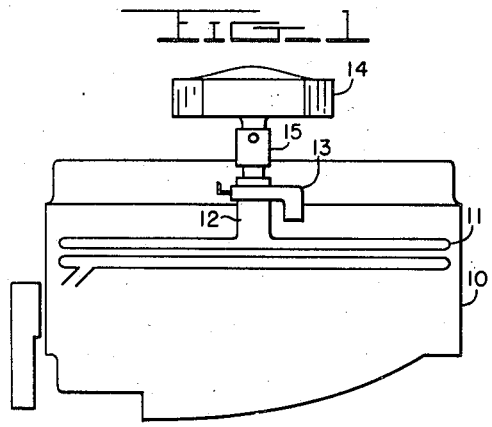
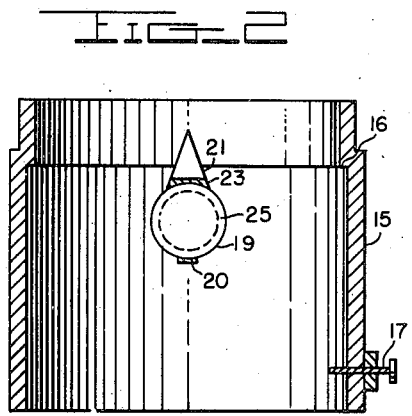
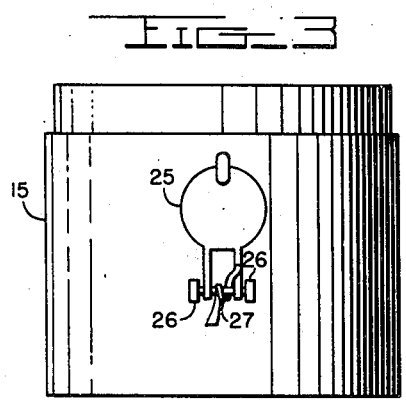
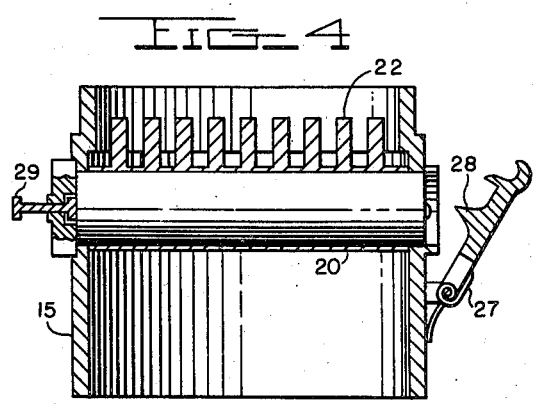
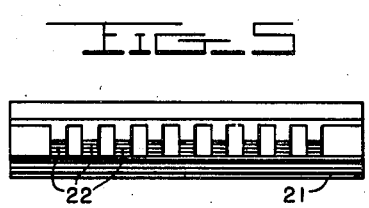
Inventor
ROBERT I. OLSEN
By M. P. Hayes
Attorney Patented Nov. 2, 1948

2,452,597

UNITED STATES PATENT OFFICE 2,452,597

LOW-TEMPERATURE ENGINE STARTING AID

Robert I. Olsen, United States Navy

Application May 28, 1947, Serial No. 751,005

6 Claims. (Cl. 123—122)

(Granted under the act of March 3, 1883, as amended April 30, 1928; 370 O. G. 757)

This invention relates to the problem of starting internal combustion engines under low temperature conditions, and is particularly directed to heating air taken into the charge forming apparatus.

It is a primary object of the invention to heat the air taken into an internal combustion engine carburetor and manifold system for initial starting thereof under low temperature conditions.

It is a further object of the invention to provide means for heating such low temperature intake air without substantial decrease in intake manifold aerodynamic efficiency under running conditions.

It is another object of the invention to provide for heating intake manifold air without a drain on the electrical system associated with the engine.

It is a further object of the invention to provide an intake air heater device easily attached to existing internal combustion engines.

The invention provides for the initial heating of intake air by the use of a suitable exothermic chemical heating unit capsule which may be inserted directly in the intake air passages. Units of this type are known and available for supplying very substantial amounts of heat of relatively high temperatures over limited periods. Such heating units, available on the open market at the present time for other purposes, are readily adaptable for use with the instant invention. The chemical reaction of these units may be initiated in various ways, but a percussion cap device is conveniently employed.

The present invention provides for the positioning of such a unit in the intake manifold system, so that air drawn into the engine under cold starting conditions is preheated to obtain proper fuel vaporization and an efficient charge formation which may be passed into the cylinders without undue condensation.

The invention will be further described with reference to the specific embodiment shown for exemplary purposes in the drawings, in which:

Figure 1 shows the present invention as employed in an internal combustion engine, Figure 2 shows a vertical section of one form of the instant invention, Figure 3 shows a side elevational view of the form of the invention shown in Figure 2, Figure 4 shows a top view of the specific embodiment, and Figure 5 shows a detail of the present invention.

The internal combustion engine 10 shown in Figure 1 is provided with an intake manifold 11 provided with inlet 12 for receiving carburetor 13. An air intake filter 14 is provided which is usually mounted on top of the carburetor intake.

In the exemplary embodiment shown in the drawings, the present invention comprises an intake manifold member 15 positioned between the air intake filter and the carburetor. The unit is properly dimensioned so as to be received in the carburetor inlet and is designed to receive at its upper end the air filter outlet. The unit shown may therefore be conveniently applied to the intake manifold system of existing internal combustion engines.

The heating unit 15 is shown in section in Figure 2. It comprises an elongated body portion of a size to be received on the carburetor inlet. At its upper end a shoulder 16 may be provided for positioning the air filter as shown in Figure 1. The unit of Figure 2 is designed to employ a cylindrical chemical heating capsule element which is positioned diametrically across the intake manifold passage. Heat conducting and transfer means are provided which additionally position and support the heating element in the unit.

As shown in dotted line in Figure 2, the heating element 19 is positioned between retainer member 21 thereabove and lower member 20. As shown in detail of Figure 4 member 21 tapers in a plurality of heat exchange elements 22 and is shaped at its surface 23 to conform to the heating element in heat exchanging relationship.

Members 20 and 21 extend diametrically transversely across the manifold passage in unit 15 as shown in Figure 4.

As indicated also in Figures 2 to 4, the heating element is introduced into the unit through aperture 9 in the side wall provided with door 25. Door 25 is pinioned on extensions 26 affixed to the body of unit 15, and is spring pressed by 27 to a closed position. As shown best in Figure 4, door 25 is provided with a firing detent 26 engageable with the firing cap at the end of heating element 19.

In order to remove the heating element after use, a retractable pin 29 is provided for engagement centrally therewith opposite the closure so that upon opening of the closure, the heating capsule may be moved out of the manifold passage and disposed of.

The operation of the present invention may now be described. Preliminary to starting the internal combustion engine 10 in Figure 1, closure 25 may be opened and a heating capsule such as 19 inserted diametrically thereacross. The closure door 25 may be permitted to snap shut under action of spring 27 thus bringing detent 28 forceably into contact with the firing cap on the end of the heating element to initiate the exothermic reaction of its constituents. During the period before actual starting of the engine, the heat radiated and thermally convected from the capsule will warm adjacent parts of the intake manifold system such as unit 15 and air filter structure 14. During the cranking operation, this initially highly heated air will pass then into carburetor 13 to assist in vaporizing the fuel received there, and maintaining such charge in a vaporized condition as it passes through intake manifold 11 and into the cylinders. As further air is drawn past the heating element and the heat exchanger 22 the proper intake charge will be provided and maintained, and initial efficient operation of the engine will result therefrom. The exothermic reaction in element 19 may be timed to last for a period of a few minutes, during which the engine surface will become efficiently warm to permit continued satisfactory operation at the end of the heating period. Upon completion of the operation, the heater element may be removed to reduce the input obstruction; although the generally streamline profile of the capsule and members 22 do not render this necessary.

Whereas exothermic heating elements have been described generally above, they may comprise mixtures such as the following:

| | | | |
|---|---|---|---|
| Ammonium nitrate | 61 | 61 | 56 |
| Powdered iron | 34 | 30 | 36 |
| Vegetable starch | 2 | 3 | 2 |
| Long fibered asbestos | 3 | -- | 3 |
| Glass fiber | -- | 3 | -- |
| Magnesium oxide | -- | 3 | -- |
| Sodium nitrate | -- | -- | 3 |

The constituent may be mixed and compressed in a metal tube or container of other shape to provide the heating capsule.

Further devices of this nature are described such as in the following British patents: No. 4580 of 1904; No. 8642 of 1915. A unit such as that specifically shown at 19 is manufactured and sold under the name "Redi-Heat" by the Mine Safety Appliance Company, and consists of a metallic shell entirely enclosing the exothermic mixture, and carrying a firing cap in one end thereof to initiate the heating operation.

The invention described herein may be manufactured and used by or for the Government of the United States of America for governmental purposes without the payment of any royalties thereon or therefor.

What is claimed is:

1. An intake manifold air heater unit comprising a hollow body portion defining a manifold passage, aperture means in the body portion for admitting an exothermic chemical heating capsule into the manifold passage, supporting means carried by the body operative to receive the capsule in a position transverse of the passage, and biasing means retractably engageable with the capsule for positioning the same on the supporting means.

2. An intake manifold air heater comprising a manifold section, aperture means in said section, closure means for the aperture means, cap-firing detent means on the closure means and means on the manifold section opposite the aperture means for receiving a heating capsule inserted in the aperture means.

3. An intake manifold air heater comprising a manifold section, means in said section for receiving an exothermic chemical heating capsule and spring-pressed retaining means operative to engage such capsule.

4. An intake manifold air heater unit comprising a hollow cylindrical body portion, a pair of spaced parallel heater positioning members extending diametrically thereacross, aperture means in the body portion between the members, means for closing the aperture means, and means movably mounted on the body opposite the aperture means extensible between the members for removing a heater.

5. In combination, a manifold section, means for positioning an exothermic chemical heating capsule within the manifold section, and means movably carried by the manifold section for removing the capsule after use.

6. An intake manifold air heater comprising a hollow body portion defining a manifold passage, aperture means for admitting an exothermic heating capsule into the manifold passage, and supporting means carried by the body portion operative to position the capsule in the manifold passage in heat exchanging relation with air passing therethrough.

ROBERT I. OLSEN.

No references cited.